Nov. 15, 1949     A. L. MURRAY     2,488,317
METHOD OF FABRICATING SWATTER HEADS
Filed April 26, 1944
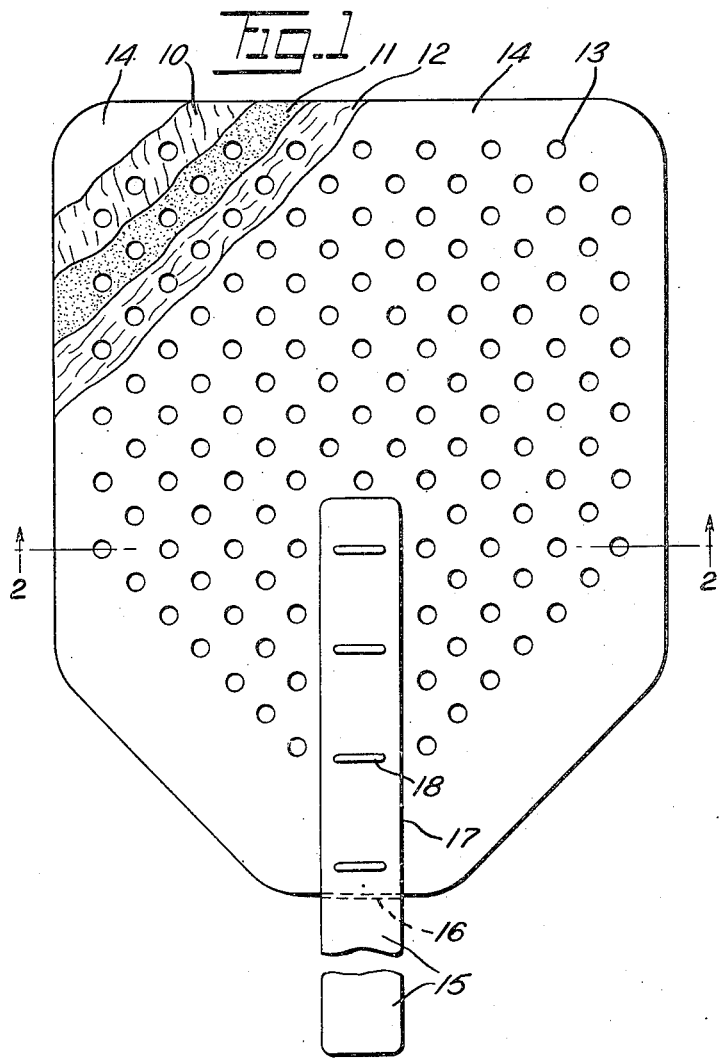
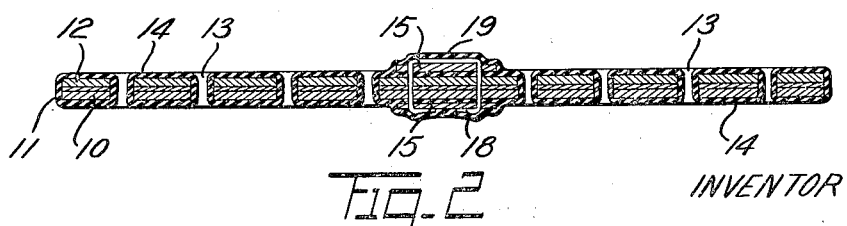
INVENTOR
ALBERT L. MURRAY
BY
*Lockwood, Goldsmith & Galt,*
ATTORNEYS

UNITED STATES PATENT OFFICE 2,488,317

METHOD OF FABRICATING SWATTER HEADS

Albert L. Murray, Auburn, Ind.

Application April 26, 1944, Serial No. 532,752

1 Claim. (Cl. 154—121)

This invention relates to a fly swatter and the like.

The chief object of this invention is to provide a swatter that will not mar furniture, etc., in use and which has considerable rigidity and flexibility, that is to say it will readily bend but promptly return to its original condition.

The chief feature of the present invention resides in forming a swatter body of a plurality of layers of wood veneer having their grain direction biased and suitably secured together and covered with a flexibile covering of rubber or rubber-like material.

Other objects and features will be set forth more fully hereinafter.

The full nature of the invention will be understood from the accompanying drawings and the following description and claim:

In the drawings Fig. 1 is a plan view of a swatter embodying the invention, parts being progressively broken away to show other parts in succession.

Fig. 2 is a sectional view taken on line 2—2 of Fig. 1 and in the direction of the arrows.

In the drawings 10 indicates one layer of veneer, 12 a second layer and 11 an interposed layer of cement which may be pressure and heat settable. Preferably the grain of said veneer layers is biased relative to each other as illustrated. This increases the relative rigidity of the unit and prevents ply breakage, yet does not unduly lessen resilience or ability of the unit to bend under impact and then resume its original position when the constraint is removed.

To prevent marring of furniture and the like, the multi-ply body is covered by a rubber or rubber-like coating or covering 14. This also is subjected to heat and pressure.

The cement 11 may be of material similar to that of the coating or of a different character, as for example the coating may be any suitable synthetic rubber and the cement may be a non-repugnant resin or plastic.

The two plies of veneer are properly positioned together with the intervening cement and then die cut to shape. Simultaneously with said cutting the apertures 13 are cut through both plies. Thereafter the body may be dipped into a solution of rubber material. This seals all exposed edges or surfaces of the body portion interior. Thereafter the dipped body may be cured in suitable molds under proper temperature and pressure control. This also simultaneously sets the ply cement. The apertures 13 may be either blown out of the rubber-like coatings or the mold may have projections to match them.

A handle 15 is longitudinally notched at 16 and the resulting parallel extensions 17 straddle the body and are secured thereto and together by staples 18. If desired, the handle structure also may be rubber coated as at 19, see Fig. 2, at least for an appreciable portion and preferably that portion which straddles the swatter body. If desired, the handle may be made of a suitable number of veneer plies, say four or five, similarly biased and cementitiously secured together and rubber or like coated if desired.

The coating in all instances covers all rough edges, prevents splintering or slivering, etc., as well as furniture marring. It also tends to prevent ply separation.

If a coated handle is subsequently applied to a coated body the staples naturally embed themselves in the handle coating and thus cannot mar furniture. Naturally, if the coating is applied after stapling the staples are suitably covered and thus concealed and also prevented from separation and loss.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claim.

The invention claimed is:

A method of fabricating a swatter head having a body comprised of a pair of plies of veneer arranged with their grain in biased relation, a cementitious material between adjacent plies, and a rubber-like coating covering all exposed faces and edges of the body, the body including a plurality of apertures therethrough and the coating sealing the walls of the apertures, comprising assembling the plies together with cement material therebetween simultaneously perforating all assembled plies, applying a coating to the assembled structure including the perforation walls, and then subjecting the coated, assembled structure to heat and pressure for simultaneously curing the coating and setting the cement material to form a comparatively rigid but resilient swatter body.

ALBERT L. MURRAY.

REFERENCES CITED

The following references are of record in the file of this patent:

UNITED STATES PATENTS

| Number | Name | Date |
|---|---|---|
| 325,785 | Butterfield | Sept. 8, 1885 |
| 1,170,408 | Bruen | Feb. 1, 1916 |
| 1,268,640 | Stearns | June 4, 1918 |
| 1,586,076 | Dickey | May 25, 1926 |
| 1,628,886 | Jackson et al. | May 17, 1927 |
| 1,664,866 | Stoddard | Apr. 3, 1928 |
| 1,863,799 | Loetscher | June 21, 1932 |
| 1,981,909 | Dunn et al. | Nov. 27, 1934 |
| 2,098,754 | Nichowitz | Nov. 9, 1937 |
| 2,311,546 | Hurt | Feb. 16, 1943 |
| 2,325,584 | Barnhart | Aug. 3, 1943 |
| 2,361,023 | Glomb | Oct. 24, 1944 |

FOREIGN PATENTS

| Number | Country | Date |
|---|---|---|
| 802,060 | France | May 30, 1936 |